(12) United States Patent
Balfe et al.

(10) Patent No.: US 10,589,227 B2
(45) Date of Patent: Mar. 17, 2020

(54) HIGH SOLIDS FLUX CIRCULATING CARBONATION REACTOR

(71) Applicant: General Electric Technology GmbH, Baden (CH)

(72) Inventors: Michael Charles Balfe, Mainz (DE); Olaf Stallmann, Essenheim (DE); Gerhard Heinz, Esslingen (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 44 days.

(21) Appl. No.: 15/402,270

(22) Filed: Jan. 10, 2017

(65) Prior Publication Data

US 2017/0144104 A1    May 25, 2017

Related U.S. Application Data

(60) Division of application No. 14/499,726, filed on Sep. 29, 2014, now Pat. No. 9,573,096, which is a (Continued)

(30) Foreign Application Priority Data

Mar. 30, 2012    (EP) ..................... 12162734

(51) Int. Cl.
*B01D 53/83* (2006.01)
*C01F 11/18* (2006.01)
(Continued)

(52) U.S. Cl.
CPC ............. *B01D 53/83* (2013.01); *B01D 45/12* (2013.01); *B01D 53/62* (2013.01); *B01D 53/82* (2013.01); *B01D 53/96* (2013.01); *B01J 8/24* (2013.01); *C01B 32/60* (2017.08); *C01F 11/18* (2013.01); *F27B 15/16* (2013.01); *B01D 2251/402* (2013.01); *B01D 2251/404* (2013.01); *B01D 2257/504* (2013.01); *Y02C 10/04* (2013.01)

(58) Field of Classification Search
None
See application file for complete search history.

(56) References Cited

U.S. PATENT DOCUMENTS 2,741,546 A * 4/1956 Sweeney .................. B01J 8/005
                                            208/156
4,026,679 A    5/1977 Collin
(Continued)

FOREIGN PATENT DOCUMENTS

CN    101298023 A    11/2008
DE    102007015082 A1    10/2008
(Continued)

OTHER PUBLICATIONS

Morin, J. WO2010052400A1-translated document (Year: 2010).*

*Primary Examiner* — Walter D. Griffin
*Assistant Examiner* — Jelitza M Perez
(74) *Attorney, Agent, or Firm* — Grogan, Tuccillo & Vanderleeden, LLP

(57) ABSTRACT

A system for capturing carbon dioxide $CO_2$ by carbonation in a circulating fluidized bed (CFB) carbonation reactor wherein temperature profile is adjusted by recirculation of solid fractions of metal oxide MeO and metal carbonate $MeCO_3$ to the CFB carbonation reactor.

9 Claims, 1 Drawing Sheet

Related U.S. Application Data continuation of application No. PCT/IB2013/052449, filed on Mar. 27, 2013.

(51) Int. Cl.
| | | |
|---|---|---|
| *B01D 53/96* | (2006.01) | |
| *F27B 15/16* | (2006.01) | |
| *C01B 32/60* | (2017.01) | |
| *B01D 53/62* | (2006.01) | |
| *B01D 53/82* | (2006.01) | |
| *B01J 8/24* | (2006.01) | |
| *B01D 45/12* | (2006.01) | |

(56) References Cited

U.S. PATENT DOCUMENTS

| | | |
|---|---|---|
| 4,330,430 A | 5/1982 | Lancet et al. |
| 2002/0037246 A1 * | 3/2002 | Beal ............... B01D 53/501 423/230 |
| 2010/0086456 A1 | 4/2010 | Epple |
| 2011/0250550 A1 | 10/2011 | Garcia et al. |

FOREIGN PATENT DOCUMENTS

| | | | |
|---|---|---|---|
| EP | 2174699 A1 | 4/2010 | |
| EP | 2614877 A1 * | 7/2013 | ............ B01D 53/62 |
| WO | 94/08194 A1 | 4/1994 | |
| WO | 2010/052400 A1 | 5/2010 | |
| WO | WO-2010052400 A1 * | 5/2010 | ............ B01D 53/62 |

\* cited by examiner

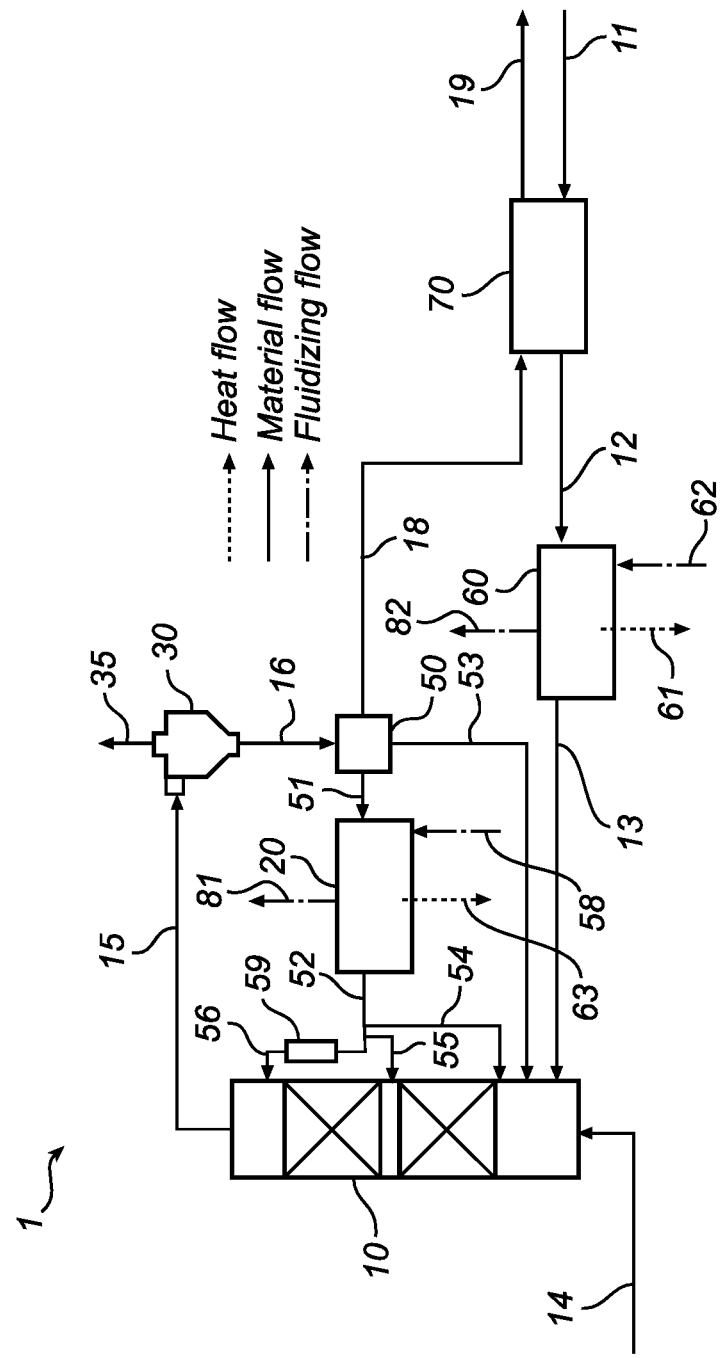

HIGH SOLIDS FLUX CIRCULATING CARBONATION REACTOR

CROSS-REFERENCE TO RELATED APPLICATIONS

This application is a Divisional of and claims priority to U.S. application Ser. No. 14/499,726, filed Sep. 29, 2014, which in turn claims priority to PCT/IB2013/052449 filed Mar. 27, 2013, which in turn claims priority to European application 12162734.3 filed Mar. 30, 2012, all of which are hereby incorporated in their entireties.

TECHNICAL FIELD

The invention relates to a method for capturing carbon dioxide $CO_2$ by a carbonization reaction wherein recirculation of cooled $MeCO_3$ rich solid streams is included. Also, the present invention relates to a system comprising a reactor for capturing carbon dioxide $CO_2$ from a $CO_2$ rich flue gas.

BACKGROUND

Capturing carbon dioxide ($CO_2$) may be performed by a carbonation reaction in a circulating fluidized bed (CFB) using solids of metal or mineral oxides. The metal or mineral oxide acts as an absorbent of the $CO_2$, being a solid sorbent.

The reaction that takes place in the CFB carbonation reactor is an exothermic reaction. The rate of reaction is dependent largely on the available surface area of the solid sorbent. In addition, to satisfy reaction kinetic and equilibrium requirements of the absorption process, precise control of the temperature profile throughout the reactor is required. Therefore, any reactor optimization must consider the absorption heat release, which is 178 kJ/kmol for calcium oxide (CaO) reacting with $CO_2$. The reactor design must incorporate the resulting temperature from the exothermic reaction and any resulting implications that would affect the equilibrium driving forces and $CO_2$ concentration profiles.

In a CFB carbonation reactor for processing low pressure combustion flue gas, the fractions of solid materials are very low to avoid the otherwise considerable pressure drop and associated fan compression power. Reducing equipment sizes for such fluidized bed processes implies increasing fluidization velocities which may also lead to pneumatic transport operating regimes. The resulting low fractions of solid material are characterized by low overall heat transfer coefficients which ultimately depend on the fluidization gas properties. Consequently, the presently known systems for capturing carbon dioxide $CO_2$ in CFB carbonation reactor require relatively large heat transfer surfaces which must be applied internally to remove heat from the reacting system and avoid a temperature increase of the solids sorbent to the point where the equilibrium driving force disappears and the reaction no longer occurs.

Previously known reactors remove heat from the CFB carbonation reactor according to the rate of adsorption via heat transfer area installed in the reactor. These CFB carbonation reactors include internal cooling arrangements which are placed at specified, predetermined locations. A consequence of this is that any fluctuation in process operating conditions requires adjustment in the cooling system. Such unpredictable fluctuations are disadvantageous when processes utilizing the CFB carbonation reactor waste heat are forced to absorb fluctuations due to poor CFB carbonation reactor control. Consequently, there is a demand to improve the heat transfer characteristics of the system, and to optimize the method by which heat transfer occurs to ultimately reduce heat transfer surface area and plant cost.

Moreover, a careful control of the reactor temperature is of importance for avoiding regions having low temperature and a slow reaction rate, or high temperatures and poor equilibrium driving forces. In general, poor reactor design would lead to larger reactor dimensions than otherwise required for obtaining the same carbon dioxide $CO_2$ capture rate.

For example, considering calcium oxide CaO as sorbent, and a concentration of carbon dioxide $CO_2$ in the carbon dioxide $CO_2$ rich flue gas forwarded to the CFB carbonation reactor of 12% by volume, 90% of the carbon dioxide $CO_2$ may be captured corresponding to an equilibrium carbon dioxide $CO_2$ partial pressure at 650° C. However, if the corresponding equilibrium carbon dioxide $CO_2$ partial pressure at 700° C. is considered, for the same flue gas, a maximum of only ~70% capture is possible.

SUMMARY

By the present invention some of the drawbacks and deficiencies of the prior art reactors for capturing carbon dioxide $CO_2$ as well as for the system for carbonation are overcome. The invention provides a method and a system for capturing carbon dioxide $CO_2$ from carbon dioxide $CO_2$ rich flue gas wherein the heat transfer area and the temperature profile may be controlled and adjusted in a flexible way.

An embodiment of the invention is a method for capturing carbon dioxide $CO_2$ by carbonation in a circulating fluidized bed (CFB) carbonation reactor provided. The method comprises the steps of:

forwarding a metal oxide MeO rich solids stream to the lower part of a circulating fluidized bed (CFB) carbonation reactor;

forwarding carbon dioxide $CO_2$ rich gas stream to said reactor;

capturing of carbon dioxide $CO_2$ by reacting the carbon dioxide $CO_2$ present in the carbon dioxide $CO_2$ rich gas system with metal oxide MeO, forming metal carbonate $MeCO_3$;

separating the metal carbonate $MeCO_3$ from flue gas in a separating unit;

collecting a metal carbonate MeCO3 rich solids stream from the separating unit;

subsequent division and cooling of the metal carbonate MeCO3 rich solids stream into two or more cooled solid streams forming two or more cooled solid stream portions; and adjusting the temperature of the CFB carbonation reactor by adding the one or more cooled portions of said metal carbonate MeCO3 rich solids streams to said CFB carbonation reactor at one or more possible locations to optimize the temperature profile for CO2 capture purposes.

In one embodiment, the metal oxide MeO rich solid stream is forwarded to the lower part of the circulating fluidized bed (CFB) carbonation reactor.

According to one embodiment of the method, the temperature is adjusted by cooling and recirculating a first portion of $MeCO_3$ rich solids stream to the CFB carbonation reactor. Preferably the first portion is recirculated to an inlet in the lower part of the CFB carbonation reactor.

An advantage provided by this embodiment is that heat generated from the capture of $CO_2$ in the carbonation reactor is removed externally from the reactor while obtaining a very stable (close to constant) temperature profile by circulating a large quantity of the MeCO$_3$ rich sorbent stream dampening the temperature increase in the CFB riser. The external removal of heat is more efficient and cost effective. Heat is removed externally at a temperature level which is typically between 10 and 50° C. below the average reactor temperature. Circulating less solids will allow the temperature profile gradient to increase (worsening the equilibrium driving force but requiring less fan power) while, circulation of more solids will moderate or flatten the profile but will require increased specific fan powers. The chosen optimum operating temperature and circulation rate must be considered on a case by case basis to maximize value.

An additional embodiment of the method is wherein the temperature is adjusted by cooling and recirculating a second (third or fourth . . . ) portion (smaller quantities at lower temperatures, 50° C. to 200° C. below the average reactor temperature), of solid MeCO$_3$ rich solids to an intermediate region(s) or location(s) along the height profile of the reactor to control the temperature increase in the riser resulting from the exothermic absorption reaction. Further, in this embodiment heat from the capture of CO$_2$ in the carbonation reactor is removed externally and a uniform profile is obtained while reducing the total required solids circulation rate. Increasing the temperature difference between the cooled circulated solids stream and the average reactor temperature lower the quality of heat removed from the process but allows efficient external heat removal in a cost effective manner without significantly increasing flue gas fan power consumption by circulating less solids.

In both cases the reactor temperature is adjusted by removing heat from a circulated MeCO$_3$ rich solids stream. The circulated MeCO$_3$ rich solids stream may be cooled in any device located downstream the CFB carbonation reactor, one such possibility is to cool the solids in a fluidized bed heat exchanger located downstream the solids separation device.

Further, the temperature of the portion of MeCO$_3$ rich solids which is added to the lower part of the reactor may be as high as 10° C. below the average reactor temperature. Portions of MeCO$_3$ added to locations further up along the height profile of the reactor may be cooled to more than 200° C. below the average reactor temperature, via the fluidized bed heat exchanger. These added portions may be added to lower the local reactor temperature through solids addition and mixing.

According to other aspects illustrated herein an embodiment of the invention is a system for capturing carbon dioxide from a carbon dioxide CO$_2$ rich flue gas stream.

The system comprises:
a circulating fluidized bed (CFB) carbonation reactor for capturing the carbon dioxide CO$_2$ present in the flue gas by a carbonation reaction;
a pipe forwarding a metal oxide MeO rich stream to the CFB carbonation reactor;
a pipe forwarding the carbon dioxide CO$_2$ rich flue gas stream to the reactor;
a separation device downstream the circulating fluidized bed (CFB) carbonation reactor separating the MeCO$_3$ rich stream from the flue gas;
a split device for dividing the MeCO$_3$ rich streams in two or more portions downstream the separating unit;
a fluidized bed heat exchanger for heat exchange the MeCO$_3$ rich stream before entering the CFB carbonation reactor;
a pipe for recirculating a first portion of the cooled MeCO$_3$ rich stream to the CFB carbonation reactor; and optionally, a pipe for bypassing a portion of the MeCO$_3$ rich stream to the lower section of the CFB carbonation reactor.

The riser of the CFB carbonation reactor, thus the arrangement which transports the solid material to the elevated solids separation device, which may utilize internal components, such as static mixing devices or distributors, to improve the radial distribution of solids over the cross section of the reactor having an added effect of increasing the reactor solids concentration and the resulting solids hold-up.

Control of the temperature profile in the CFB carbonation reactor is achieved by re-circulating streams of solid materials. These re-circulated streams have the effect to dampen the increase of temperature which occurs due to heat evolution taking place in the CFB carbonation reactor. In this case, typically all the streams of solid materials forwarded from the separating unit are forwarded over some type of heat exchanger before being returned to the CFB carbonation reactor.

In the case the heat exchange is effected by way of a fluidized bed heat exchanger fluctuations in process conditions may be compensated via modifications to the fluidization conditions, in turn influencing the heat transfer coefficient allowing the temperature of the cooling side to remain constant (effectively changing heat flow or duty).

Optionally, also another heat exchanger, typically a feed effluent heat exchanger, for transferring heat from the hot MeO rich stream to the cold MeCO$_3$ rich steam can be used to reduce total process heating and cooling requirements. This heat exchanger may also be a fluidized bed heat exchanger.

Depending on circulation rates, internal (over the solids separation device and the carbonation reactor riser) and external (between the solids separation device downstream the carbonation reactor and an external system which converts the MeCO$_3$ to MeO) the temperature of the solid material in the stream exiting the respective heat exchangers must be selected to off-set the heat of reaction before being circulated back to the carbonation reactor. In addition, the locations where the solids are introduced must be selected to ensure a suitable temperature profile over the height of the reactor.

Further objects and features of the present invention will be apparent from the following detailed description and claims.

BRIEF DESCRIPTION OF THE DRAWINGS

The present invention is described in more detail below with reference to the appended drawings:

FIG. 1 is a schematic view of a system for carbonization via carbon dioxide CO$_2$ rich flue gas and with cooling system connected thereto.

DETAILED DESCRIPTION

The carbonation reaction, thus the reaction between the CO$_2$ in the flue gas and the sorbent material, for example selected from a metal oxide (MeO) forming MeCO$_3$ according to the following reaction equation:

$$MeO + CO_2 \rightarrow MeCO_3 + Heat$$

The reaction is an exothermic reaction which proceeds at a temperature depended on the metal oxide used. Controlling the temperature is important to ensure an efficient reaction system which balances kinetic and equilibrium requirements. The capturing of carbon dioxide $CO_2$ may occur with different metal oxides MeO forming metal carbonates, for example limestone. The metal oxides may also be part of a synthetic solid particle. The metal oxides used for the invention may be selected from calcium oxide CaO, magnesium oxide MgO, aluminium oxide Al2O3, zinc oxide ZnO, and calcium magnesium oxide CaMgO forming calcium carbonate (CaCO3), for example in form of calcite or aragonite; magnesium carbonate (MgCO3), for example in form of magnesite, alumina carbonate (Al2(CO3)3); zinc carbonate (ZnCO3) or in form of calcium magnesium carbonate, such as dolomite (CaMg(CO3)2), respectively. The list of metal oxides is not exhaustive and the form in which the oxides are present on the solids particles is not limited.

The carbonation reaction, thus the reaction between the $CO_2$ in the flue gas and the metal oxide (MeO) is an exothermic reaction which proceeds at a temperature of, typically, between 600° C. and 850° C., preferably about 650° C., when the metal oxide is CaO. The carbonization is an exothermic reaction, thus heat is generated and shall be removed to optimize yield, thus to optimize the portion carbon dioxide $CO_2$ captured by the metal oxide MeO.

Also the temperature profile present in the reactor, i.e. the circulating fluidized bed carbonation reactor is an important parameter for an efficient reaction. The energy and heat must be removed if a uniform temperature profile will be obtained. By optimizing the temperature profile present in the carbonation reactor the system can be made more efficient; smaller and less expensive.

Optimization of the reactor also must consider the concentration of solid particles, the mass fraction of solids in the reactor and the partial pressure of carbon dioxide $CO_2$ over the height of the reactor. The modification of all parameters is considered with the ultimate goal to minimize plant costs (capital costs and energy consumption).

FIG. 1 is a schematic representation of the system 1 for capturing carbon dioxide $CO_2$ from carbon dioxide rich flue gas by carbonization. The system comprises a circulating fluidized bed (CFB) carbonation reactor 10 wherein the bulk of the carbonization is taking place.

In the CFB carbonation reactor 10, the reaction between the $CO_2$ present in the flue gas and the solid metal oxide MeO fed to the reactor occurs. The reactor is a so-called circulating fluidized bed wherein the solid particles are fluidized together with the flue gas. The flue gas is introduced in the bottom of the reactor via the duct 14 and the metal oxide MeO rich solids are forwarded via the pipe 13 to the CFB carbonation reactor 10.

The temperature profile within the reactor varies depending on the exothermic reaction. Due to the reaction taking place heat evolution shall be controlled and adjusted. In an optimized system the operating temperature profile should be far enough below the corresponding equilibrium temperature (according to the $CO_2$ concentration profile) so as not to hinder or slow the overall reaction rate.

After reaction in CFB carbonation reactor 10, a stream rich in the metal carbonate $MeCO_3$ entrained in the flue gas is forwarded from the CFB carbonation reactor 10 via pipe 15 to a separation device 30. (Remaining $CO_2$ in the flue gas may undergo residual reaction in the solids separation device but this is small in comparison to that occurring in the CFB carbonation reactor 10. Thus, the temperature of this stream is close to the outlet temperature of the reactor and is preferably kept at about 650° C. when the metal carbonate is calcium carbonate $CaCO_3$.

The separation device 30 separates $CO_2$ lean flue gas from the stream of $MeCO_3$ rich solid particles and any non-reacted metal oxide MeO. The separation device 30 may be external to the CFB carbonation reactor 10 (as shown), for example, a cyclone but may also be a device which is partially integrated into the CFB carbonation reactor 10 acting to lower particle entrainment. It is also possible to use a combination of both types of devices internal and external. The cleaned flue gas is forwarded to a flue gas cooler via the outlet 35. The remaining solid, material rich in $MeCO_3$, is forwarded via the pipe 16 from the separation device 30. A device 50 splits the stream into several parts, this may be a type of solids-loop-seal.

The solid materials separated in the separation device 30 comprise the metal carbonate $MeCO_3$ as the main part, and is herein denoted as a "$MeCO_3$ rich stream". When calcium oxide CaO is considered as the metal oxide for capturing carbon dioxide $CO_2$ the stream has a temperature of about 650° C., when forwarded from the separation device 30, via pipe 16, to a split point 50 wherein the stream is divided into two or more portions, or streams (shown by streams 51, 53 and 18).

A portion of solids from the separation device 30 shall be forwarded to the fluidized bed heat exchanger 20. The solids present in this fluidized bed heat exchanger 20 are fluidized by a fluidizing gas forwarded into the fluidized bed heat exchanger 20 via duct 58, and leaving the heat exchanger via duct 81. The fluidized bed heat exchanger 20 is fed with fluidizing gas, the fluidizing gas, in duct 58, may be compressed air or compressed flue gas or steam. The metal carbonate $MeCO_3$ rich stream may then be split into multiple streams, i.e. two or more streams and returned to different locations in the reactor. The stream rich in solid $MeCO_3$ entering the heat exchanger 20 has a temperature of about 650° C. Depending on the solids circulation rate the temperature of the solids stream exiting the fluidized bed heat exchanger 20 must be selected to off-set the heat of reaction before being circulated back to the reactor. The point where the solids are removed from the exchanger may be used to influence the stream temperature and the point where the solids are introduced to the reactor shall be selected to ensure a suitable temperature profile over the height of the reactor. The CFB carbonation reactor 10 may use internal devices to improve the solids distribution and thus heat exchange and temperature profile.

The fluidized bed heat exchanger 20 may be one unit or may be several units operating in parallel at different temperatures. Either the stream 51 cooled before splitting (as shown) or the stream 51 is split before cooling. In any case the cooler streams of solids forwarded from the fluidized bed heat exchanger 20 are re-circulated to the CFB carbonation reactor 10 at a suitable position to improve the temperature profile. Stream 54 enters near the bottom, stream 55 near the mid-section of the riser and stream 56 near the top of the riser, as shown Another portion of the stream 16 may be bypassed to the CFB carbonation reactor 10, via pipe 53. The bypass is used to control the temperature of the lower bed to avoid considerable inlet temperature drops during plant upsets or start-up. This portion has typically a temperature of about 650° C. but during start-up may also be somewhat cooler.

The first 51 and second 53 streams as described above are re-circulated to the carbonation reaction taking place in the CFB carbonation reactor 10. The position of the inlets along with the temperature and mass flow of the streams 56, 55 or 54 may be adjusted to optimize the temperature profile in the reactor.

Optionally, fluidized bed heat exchanger 20 may be split into parallel units so that stream 52 of solids obtained after cooling may by multiple streams flowing in parallel at various temperatures, herein shown by the two streams 54, 55, 56. A portion of the stream of solids 52 enters the CFB carbonation reactor 10 via the pipe 55. Another portion of the stream of the solids 52 enters via the pipe 56. Another portion of the solids may be lifted/transported to a higher level in the reactor height profile by a suitable device 59, for example a screw device for solid material or pneumatic transport using compressed air, compressed flue gas or steam as transport medium.

From the split point, split device 50, a portion of the stream 16 of solid materials rich in $CaCO_3$ is also to be forwarded via pipe 18. The solid materials have preferably a temperature of about 650° C. This third stream is forwarded from the split point 50 via pipe 18 for further processing in a separate system. The metal carbonate $MeCO_3$ rich stream may, for example, be forwarded to a unit for decarbonisation (not shown) to convert the metal carbonate $MeCO_3$ into metal oxide and carbon dioxide $CO_2$. This reaction or process ($MeCO_3$+heat→$MeO$+$CO_2$) may also be called calcination.

The system 1 is integrated together with a system for decarbonisation of $MeCO_3$ to MeO, a process also called calcination, thus a system wherein $CO_2$ is released from the metal carbonate leaving remaining metal oxide MeO rich solids. MeO rich solids are fed to system 1 via pipe 11 into the CFB carbonation reactor 10.

Optionally, the MeO rich stream forwarded from the calcination process may be cooled in a feed effluent fluidized bed heat exchanger 70, or in a fluidized bed cooler 60, or in a system including both.

Optionally, also stream 18 may be fed to a feed effluent heat exchanger 70 for transferring heat from the hot product MeO to the cold $MeCO_3$ reducing total process heating and cooling requirements. Here, the metal carbonate is heated by a counter current stream of metal oxide MeO entering unit 70 via pipe 11. The cold $MeCO_3$ is forwarded via pipe 19 for further processing in a separate system (not shown). The cooled MeO rich stream 12 is forwarded to a second heat exchanger which further reduces the temperature before entering the CFB carbonation reactor 10 via pipe 13. The metal oxide MeO rich stream returning from the calcination process may be further cooled by fluidized bed heat exchanger 60 in parallel to unit 20. Optionally stream 12 may be fed directly to unit 20 and cooled before redistribution via stream 52 to CFB carbonation reactor 10 (not shown in the FIGURE).

The heat exchanger 60 may be a fluidized bed heat exchanger in which case fluidizing gas (air flue gas or stream) is fed via duct 62 and exits unit 60 via duct 82. Heat removed over unit 20 and unit 60 may be used for generating steam the heat streams are indicated schematically as stream number 61 and 63.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system, the system comprising:
a circulating fluidized bed (CFB) carbonation reactor;
a separation device;
a splitting device;
at least a fluidized bed heat exchanger, wherein:
the CFB carbonation reactor is configured to:
receive a metal oxide (MeO) solids stream and a flue gas stream and form a metal carbonate ($MeCO_3$) rich solids stream and a flue gas stream depleted in $CO_2$, and
forward the flue gas stream depleted in $CO_2$ and the $MeCO_3$ rich solids stream to the separation device;
the separation device is configured to separate the flue gas steam depleted in $CO_2$ from the $MeCO_3$ rich solids stream and forward the $MeCO_3$ rich solids stream to the splitting device; and
the splitting device is configured to separate the $MeCO_3$ rich solids stream into at least a first $MeCO_3$ rich solids stream and a second $MeCO_3$ rich solids stream;
at least one pipe for providing the at least a first $MeCO_3$ rich solids stream to the fluidized bed heat exchanger to form at least a first cooled $MeCO_3$ rich solids stream and a second cooled $MeCO_3$ rich solids stream;
at least one pipe for providing the at least a first cooled $MeCO_3$ rich solids stream from the fluidized bed heat exchanger to the CFB carbonation reactor at a first location;
at least one pipe for providing the at least a second $MeCO_3$ rich solids stream to the CFB carbonation reactor at least a second location separate from the first location; and
at least one pipe for providing the at least a second cooled $MeCO_3$ rich solids stream to the CFB carbonation reactor at a third location separate from the first and second locations.

2. The system according to claim 1, wherein the CFB carbonation reactor is configured to receive the at least a first cooled $MeCO_3$ rich solids stream at a bottom region of the CFB carbonation reactor.

3. The system according to claim 1, wherein the CFB carbonation reactor is configured to receive the at least a first cooled $MeCO_3$ rich solids stream at an intermediate region of the CFB carbonation reactor.

4. The system according to claim 1, wherein the splitting device is configured to separate the $MeCO_3$ rich solids stream into at least a third $MeCO_3$ rich solids stream.

5. The system according to claim 4, further comprising at least one pipe for providing the at least a third $MeCO_3$ rich solids stream to a calcination system to form a MeO rich solids stream.

6. The system according to claim 5, further comprising at least one pipe for providing the MeO rich solids stream to the CFB carbonation reactor.

7. The system of claim 6, further comprising at least a heat exchanger configured to cool the MeO rich solids stream prior to being provided to the CFB carbonation reactor.

8. The system according to claim 1, wherein the separation device is located external to the CFB carbonation reactor.

9. The system according to claim 1, wherein the separation device is located internal to the CFB carbonation reactor.

* * * * *